US012612033B2

(12) United States Patent
Nariyambut murali et al.

(10) Patent No.: US 12,612,033 B2
(45) Date of Patent: Apr. 28, 2026

(54) HITCH ASSIST TRAILER, COUPLER AND HITCHBALL DETECTION AND TRACKING METHOD

(71) Applicant: FORD GLOBAL TECHNOLOGIES, LLC, Dearborn, MI (US)

(72) Inventors: Vidya Nariyambut murali, Sunnyvale, CA (US); Roger Arnold Trombley, Ann Arbor, MI (US); Leonidas Kiliaris, Southgate, MI (US); Jeremy Ferack, Livonia, MI (US); Akshay Prabhakarrao Moharir, South Lyon, MI (US); Michael Litvak, Tel Aviv (IL); Noga Zieber, Brookline, MA (US); Asaf Kagan, Herzliya (IL); Rotem Littman, Hod Hasharon (IL)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 18/613,495

(22) Filed: Mar. 22, 2024

(65) Prior Publication Data

US 2024/0336256 A1    Oct. 10, 2024

Related U.S. Application Data

(60) Provisional application No. 63/457,010, filed on Apr. 4, 2023.

(51) Int. Cl.
*B60W 30/06*      (2006.01)
*B60D 1/06*       (2006.01)
(Continued)

(52) U.S. Cl.
CPC ............... *B60W 30/06* (2013.01); *B60D 1/06* (2013.01); *B60D 1/36* (2013.01); *G06T 3/40* (2013.01);
(Continued)

(58) Field of Classification Search
CPC . B60R 1/04; B60R 1/003; B60R 1/26; B60W 30/06; B60W 40/105; B62D 13/06; B62D 15/021
(Continued)

(56) References Cited

U.S. PATENT DOCUMENTS 10,632,803 B2    4/2020  Niewiadomski et al.
11,702,017 B2 *  7/2023  Gali ........................ B60R 1/003
                                                                 348/148
(Continued)

FOREIGN PATENT DOCUMENTS

CN          108701408 B  *  4/2021  ........... G08G 1/0112

Primary Examiner — Brian A Zimmerman
(74) Attorney, Agent, or Firm — Lorne Forsythe; Price Heneveld LLP

(57) ABSTRACT

A hitch assistance system for assisting in maneuvering a vehicle toward a trailer includes a sensing system that includes an image sensor and a controller. The controller is configured to: identify a position of a coupler of the trailer based on image data received from the image sensor by utilizing a coupler detection model trained based on a library of images depicting couplers; control movement of the vehicle toward an aligned position based on the identified position of the coupler, wherein a hitch ball of the vehicle is aligned with the coupler of the trailer; determine a prospective location of the coupler in image data based on sensor data received from the sensing system; and crop image data based on the determined prospective location of the coupler.

20 Claims, 6 Drawing Sheets

(51) Int. Cl.
    *B60D 1/36*        (2006.01)
    *G06T 3/40*        (2006.01)
    *G06V 20/56*      (2022.01)

(52) U.S. Cl.
    CPC .... *G06V 20/56* (2022.01); *G06T 2207/20132*
                          (2013.01)

(58) Field of Classification Search
    USPC ........................................ 348/148; 340/932.2
    See application file for complete search history.

(56) References Cited

U.S. PATENT DOCUMENTS

| | | | | |
|---|---|---|---|---|
| 11,756,230 | B2 * | 9/2023 | Gupta | B60D 1/62 |
| | | | | 348/116 |
| 12,097,899 | B2 * | 9/2024 | Pandey | B60W 50/14 |
| 12,136,270 | B2 * | 11/2024 | Gali | G06V 10/25 |
| 12,151,620 | B2 * | 11/2024 | Raeis Hosseiny | B60D 1/36 |
| 12,330,562 | B1 * | 6/2025 | Gowda | B60K 35/00 |
| 2018/0251153 | A1 * | 9/2018 | Li | B60D 1/62 |
| 2021/0201523 | A1 * | 7/2021 | Diessner | G06T 7/60 |
| 2023/0227104 | A1 * | 7/2023 | Pandey | B60W 40/105 |
| | | | | 701/17 |
| 2023/0234504 | A1 * | 7/2023 | Vasoya | B60D 1/06 |
| | | | | 280/477 |
| 2024/0112471 | A1 * | 4/2024 | Ramirez Llanos | G06V 20/56 |
| 2024/0409158 | A1 * | 12/2024 | Pandey | B60R 1/26 |

* cited by examiner

HITCH ASSIST TRAILER, COUPLER AND HITCHBALL DETECTION AND TRACKING METHOD

CROSS-REFERENCE TO RELATED APPLICATION

This application claims the benefit of priority under 35 U.S.C. § 119 of U.S. Provisional Application No. 63/457,010, filed on Apr. 4, 2023, the entire contents of which are incorporated herein by reference.

FIELD OF THE DISCLOSURE

The present disclosure generally relates to a system for assisting in a vehicle-trailer hitching operation. In particular, the present disclosure relates to a system for identifying a trailer and identifying features of a trailer for alignment assistance between a vehicle and the trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sightlines requires an inference of the positioning of the hitch ball and hitch based on experience with a particular vehicle and trailer and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause contact between the vehicle and the trailer. Accordingly, further advancements may be desired.

SUMMARY OF THE DISCLOSURE

According to a first aspect of the present disclosure, a hitch assistance system for assisting in maneuvering a vehicle toward a trailer includes a sensing system that includes an image sensor and a controller. The controller is configured to: identify a position of a coupler of the trailer based on image data received from the image sensor by utilizing a coupler detection model trained based on a library of images depicting couplers; control movement of the vehicle toward an aligned position based on the identified position of the coupler, wherein a hitch ball of the vehicle is aligned with the coupler of the trailer; determine a prospective location of the coupler in image data based on sensor data received from the sensing system; and crop image data based on the determined prospective location of the coupler.

Embodiments of the first aspect of the present disclosure can include any one or a combination of the following features:

the controller is configured to crop the image data based on the determined prospective location of the coupler, such that a portion of the image data that does not include the prospective location of the coupler is not utilized by the controller to control movement of the vehicle;

the image data corresponding with the determined prospective location of the coupler is uncropped;

the controller is configured to identify a position of the coupler based on the uncropped image data that corresponds with the determined prospective location of the coupler;

the sensing system further includes a proximity sensor;

the controller is further configured to identify a trailer in an exterior environment of the vehicle based on sensor data received from the sensing system;

the controller is further configured to determine a trailer heading direction of the trailer based on at least one of sensor data received from the proximity sensor and image data received from the image sensor by utilizing a trailer detection model trained based on a library of images depicting trailers;

the controller is further configured to determine a hitch ball center point based on image data received from the sensing system by utilizing a hitch ball center detection model trained based on a library of images including a plurality of images respectively depicting hitch balls;

the plurality of images depicting hitch balls include hitch ball center point indication overlays, respectively;

the hitch ball depicted in at least one of the plurality of images has a generally circular outline based on the perspective of the image, and the hitch ball center point indication overlay of the at least one image is positioned at a location within the at least one image that is offset from the radial center of the generally circular outline; and the hitch ball center point indication overlay of the at least one image is positioned at a location within the at least one image that is above the radial center of the generally circular outline.

According to a second aspect of the present disclosure, a hitch assistance system includes a sensing system that includes an image sensor and a controller configured to determine a hitch ball center point based on image data received from the sensing system by utilizing a hitch ball center detection model trained based on a library of images including a plurality of images, each of the plurality of images depicting a hitch ball and a hitch ball center point indication overlay.

Embodiments of the second aspect of the present disclosure can include any one or a combination of the following features:

the hitch ball depicted in at least one of the plurality of images has a generally circular outline based on the perspective of the image, and the hitch ball center point indication overlay of the at least one image is positioned at a location within the at least one image that is offset from the radial center of the generally circular outline;

the hitch ball center point indication overlay of the at least one image is positioned at a location within the at least one image that is above the radial center of the generally circular outline;

the controller is further configured to identify a position of a coupler of a trailer based on image data received from the image sensor by utilizing a coupler detection model trained based on a library of images depicting couplers, control movement of the vehicle toward an aligned position based on the identified position of the coupler, wherein a hitch ball of the vehicle is aligned with the coupler of the trailer, determine a prospective location of the coupler in image data based on sensor data received from the sensing system, and crop image data based on the determined prospective location of the coupler;

the controller is configured to crop the image data based on the determined prospective location of the coupler, such that a portion of the image data that does not include the prospective location of the coupler is not utilized by the controller to control movement of the vehicle;

the image data corresponding with the determined prospective location of the coupler is uncropped;

the controller is configured to identify a position of the coupler based on the uncropped image data corresponding with the determined prospective location of the coupler; and the controller is further configured to identify a trailer in an exterior environment of the vehicle based on sensor data received from the sensing system and determine a trailer heading direction based on image data received from the image sensor by utilizing a trailer detection model trained based on a library of images depicting trailers.

According to a third aspect of the present disclosure, a hitch assistance system for assisting in maneuvering a vehicle into alignment with a trailer includes a sensing system that includes a proximity sensor and an image sensor, and a controller. The controller is configured to determine a hitch ball center point based on image data received from the sensing system by utilizing a hitch ball center detection model trained based on a library of images including a plurality of images, each of the plurality of images depicting a hitch ball and a hitch ball center point indication overlay. The controller is also configured to identify a trailer in an exterior environment of the vehicle based on sensor data received from the sensing system, and determine a trailer heading direction based on image data received from the image sensor by utilizing a trailer detection model trained based on a library of images depicting trailers. The controller is further configured to identify a position of a coupler of the trailer based on image data received from the image sensor by utilizing a coupler detection model trained based on a library of images depicting couplers. The controller is additionally configured to control movement of the vehicle toward an aligned position, wherein a hitch ball of the vehicle is aligned with the coupler of the trailer. The controller is also configured to determine a prospective location of the coupler in image data based on sensor data received from the sensing system pertaining to the movement of the vehicle and the identified position the coupler. Further, the controller is configured to crop image data based on the determined prospective location of the coupler, such that a portion of the image data that does not include the prospective location of the coupler is not utilized by the controller to control movement of the vehicle.

These and other features, advantages, and objects of the present disclosure will be further understood and appreciated by those skilled in the art by reference to the following specification, claims, and appended drawings.

DETAILED DESCRIPTION OF THE PREFERRED EMBODIMENTS

Figure 1:
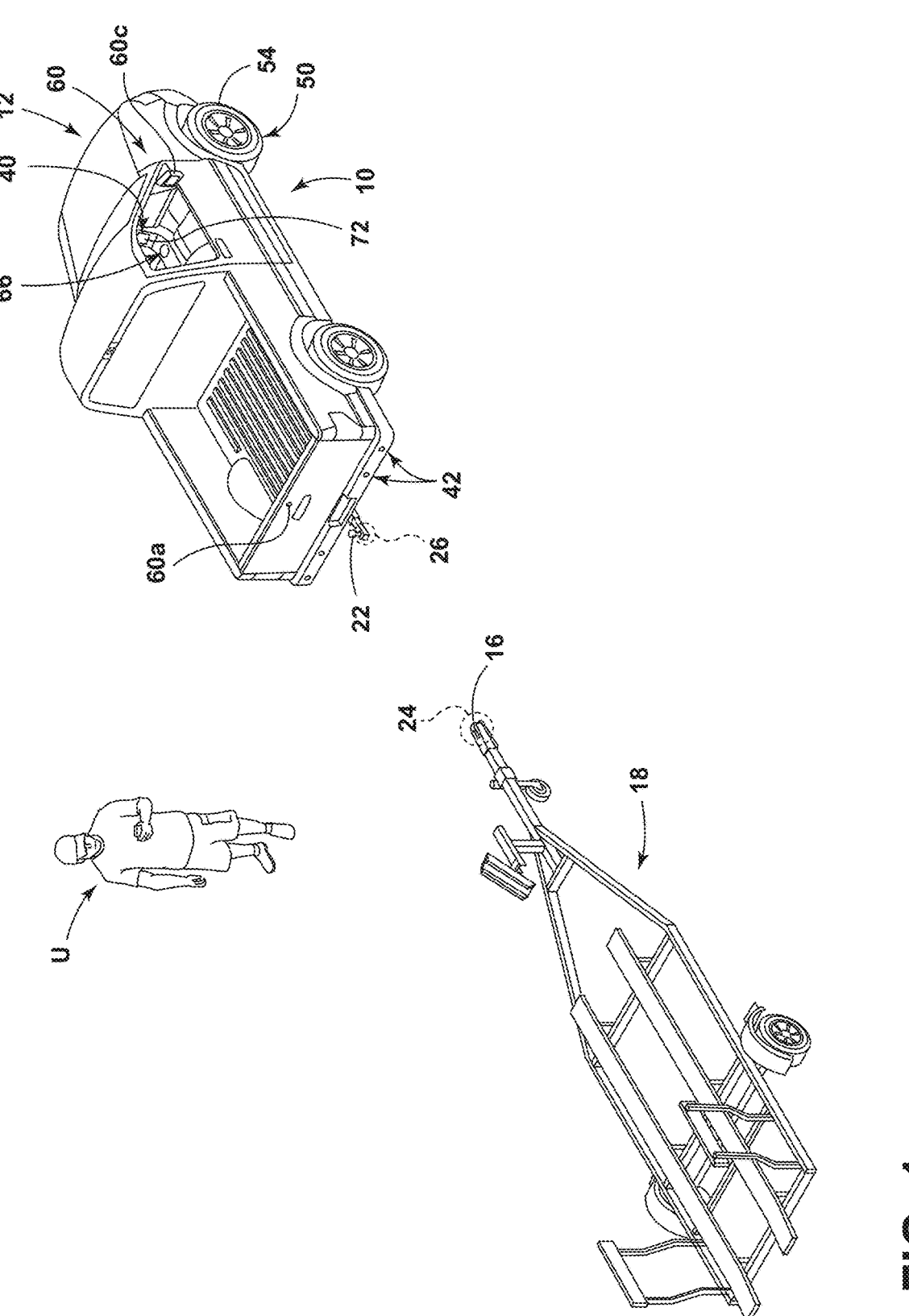
FIG. 1 is a perspective view of a vehicle in an unhitched position relative to a trailer.

For purposes of description herein, it is to be understood that the disclosed hitch assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the hitch assist system and the related methods are described with reference to a particular illustrative embodiment, the disclosure is not limited to such embodiments, and additional modifications, applications, and embodiments may be implemented without departing from the disclosure. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring generally to FIGS. 1-6, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch 22 (e.g., a hitch ball 13) of the vehicle 12 with the coupler 16. Deriving the vehicle path 20 may include a variety of steps including detecting and compensating for a change in a coupler position 24 relative to the vehicle 12 to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide enhanced navigation of the vehicle 12 and/or interaction with the coupler 16, such that trailer 18 may be effectively connected to the vehicle 12 without complication.

In various instances, the acquisition of the positional data of the trailer 18, the coupler 16 of the trailer 18, and a hitch ball center point 19 of the hitch ball 13, as discussed herein, may include the capture and processing of image data. In order to determine the position of the trailer 18, the coupler 16, and the hitch ball center point 19, the system 10 may process the image data with one or more detection models 25. For example, the system 10 may determine the position of the trailer 18 based on the processing of image data with a trailer detection model 25A. The system 10 may determine the position of the coupler 16 based on the processing of image data with a coupler detection model 25B. Further, the system 10 may determine the position of the hitch ball center point 19 based on a hitch ball center detection model 25C. The detection models 25 may be implemented as trained models consisting of algorithms and processing steps that evaluate the image data and determine whether an object or characteristics depicted conform to an object type (e.g., trailer 18, coupler 16, hitch ball 13) the detection models 25 are trained to detect such that the object positions (i.e., the positions of the trailer 18, the coupler 16, and/or the hitch ball center point 19) may be accurately identified.

In various implementations, the detection models 25 utilize neural networks that have been trained to accurately detect object types and/or characteristics of those object types. For example, the trailer detection model 25A may utilize a neural network that has been trained, based on a plurality of images of trailers 18, to accurately identify a variety of types of trailers 18 and/or characteristics of those trailers 18. Similarly, the coupler detection model 25B may utilize a neural network that has been trained, based on a plurality of images of couplers 16, to accurately identify a variety of types of couplers 16 and/or characteristics of those couplers 16. Training images can also depict trailers 18 and couplers 16 from various perspectives or angles as well as in different lighting conditions and/or weather conditions (e.g., snow, ice, rain, etc.). The hitch ball center detection model 25C may utilize a neural network that has been trained, based on a plurality of images of hitch balls 13, to accurately identify the hitch ball center point 19 of a variety of types of hitch balls 13. As described further herein, the hitch ball center detection model 25C may utilize a neural network that has been trained based on a plurality of images of hitch balls 13 that have been annotated to identify a hitch ball center point 19. Accordingly, the hitch assistance system 10 provides for the detection of a trailer type, coupler type, and/or hitch ball type associated with the respective objects depicted in the image data, such that the system 10 may utilize the information to determine the position of the trailer 18, coupler 16, and/or hitch ball center point 19 and maneuver the vehicle 12 toward the coupler position 24 for connection via a trailer detection and navigation routine 90 described further herein.

To assess the image data and trailer 18, coupler 16, and/or hitch ball center point 19, the system 10 may process the image data via the detection models 25, which may include the comparison of attributes (e.g., lines, shapes, and their spatial relationships) of the image data to previously defined or taught attributes in one or more libraries 27 of images of compatible trailers, couplers, and/or hitch balls. The one or more libraries 27 of images may be utilized by the controller 14 of the system 10 to identify corresponding trailer, coupler, and hitch ball types relative to one or more trailers 18, couplers 16, and/or hitch balls 13 depicted in image data based on a variety of image processing techniques (e.g., edge detection, background subtraction, template matching, etc.).

Figure 5:
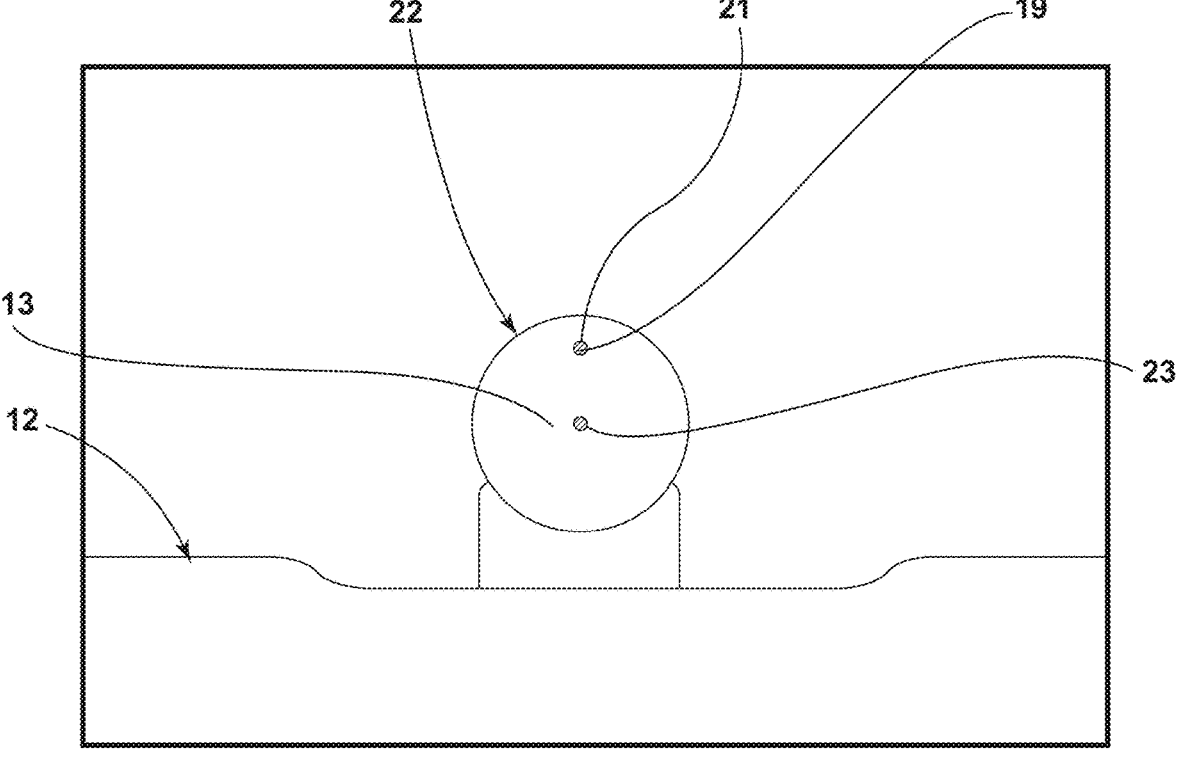
FIG. 5 is a depiction of an image of a hitch ball illustrating a circular outline of the hitch ball, a radial center of the circular outline, and a hitch ball center point indication overlay.

With regard to the hitch ball center detection model 25C, a neural network trained based on a library 27 of images of hitch balls 13 that have been modified or annotated to include a hitch ball center point indication overlay 21 may be utilized by the system 10 to determine the hitch ball center point 19 of a hitch ball 13 depicted in image data in operation of the system 10. As illustrated in FIG. 5, in some implementations, wherein the hitch ball 13 depicted in an image stored in the library 27 has a generally circular outline based on the perspective of the image, the hitch ball center point indication overlay 21 may be positioned at a location within the image that is offset from the radial center 23 of the circular outline of the hitch ball 13. The hitch ball center point indication overlay 21 being offset in this manner may account for the inaccuracies that may occur in determining the hitch ball center point 19 of a hitch ball 13 depicted in image data based on a radial center 23 of an outline of the depicted hitch ball 13 resulting from the perspective of one or more imaging devices capturing the image data of the hitch ball 13. In various implementations, the hitch ball center point 19 determined by the hitch ball center detection model 25C may correspond with a point proximate a top of the hitch ball 13 that is substantially centered in vehicle-lateral directions and in vehicle-forward and vehicle-rearward directions.

Figure 2:
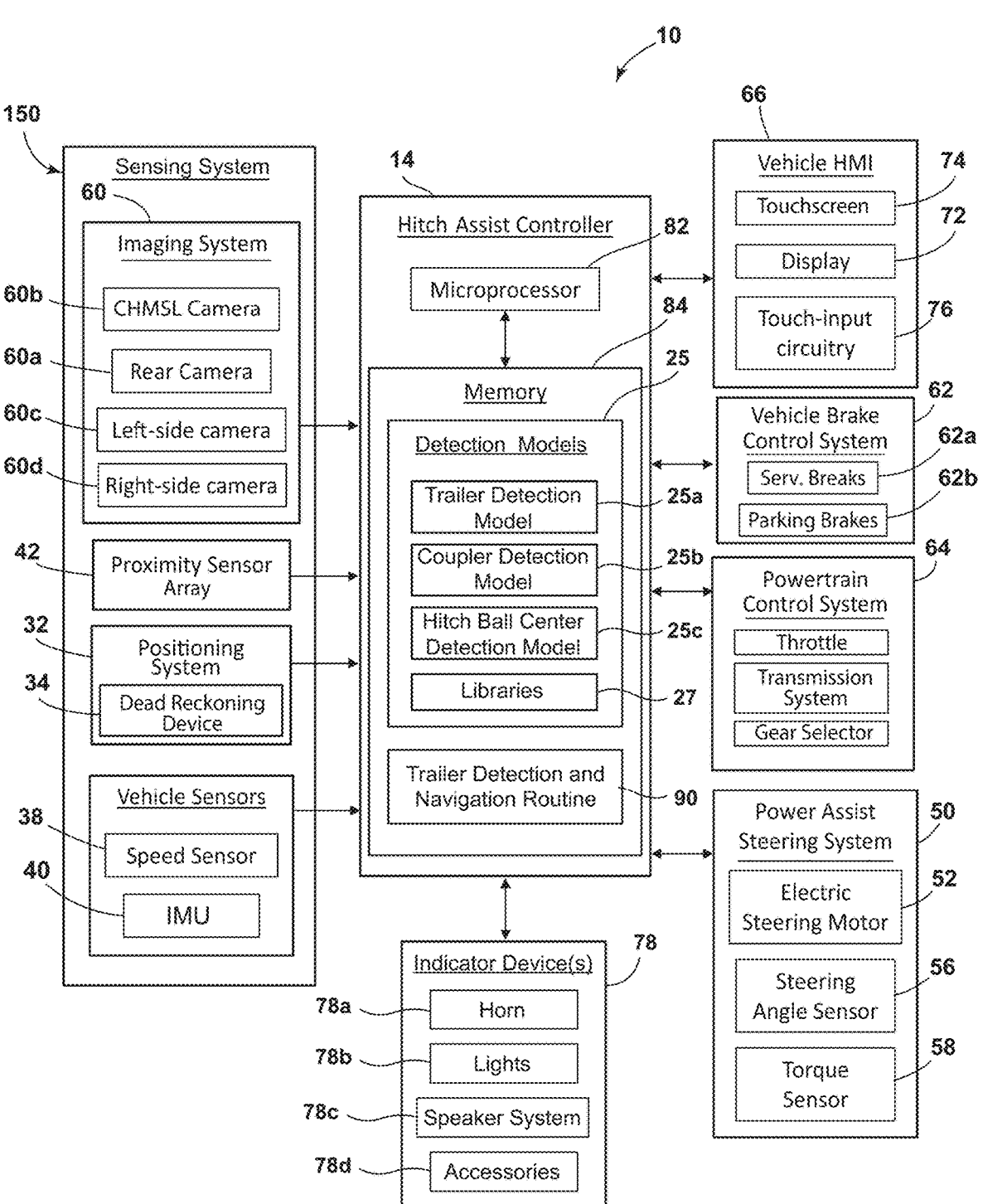
FIG. 2 is a diagram of a system according to an aspect of the disclosure for assisting in aligning the vehicle with the trailer in a position for hitching the trailer to the vehicle.
Figure 3:
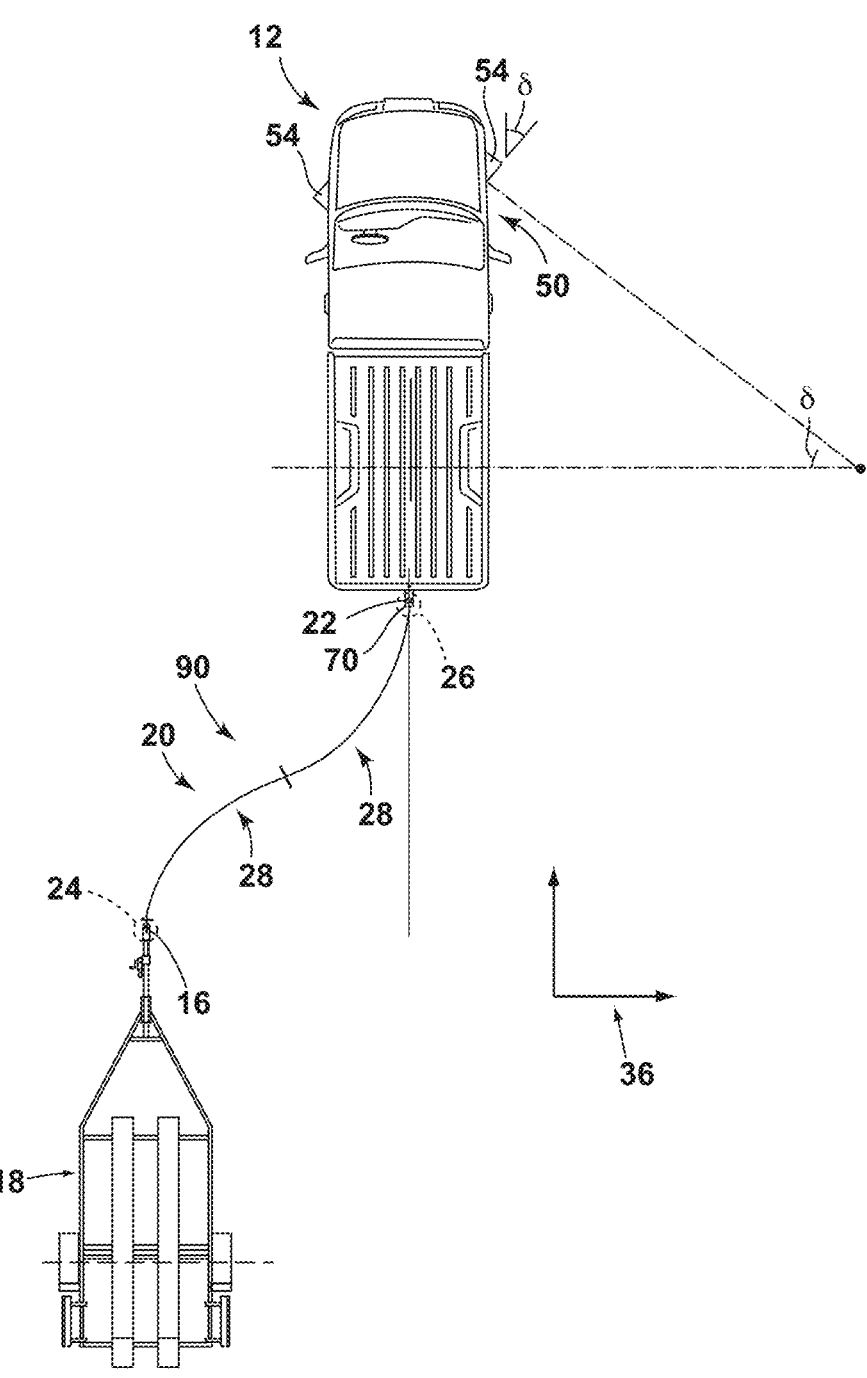
FIG. 3 is an overhead schematic view of the vehicle during a step of the alignment sequence with the trailer.
Figure 4:
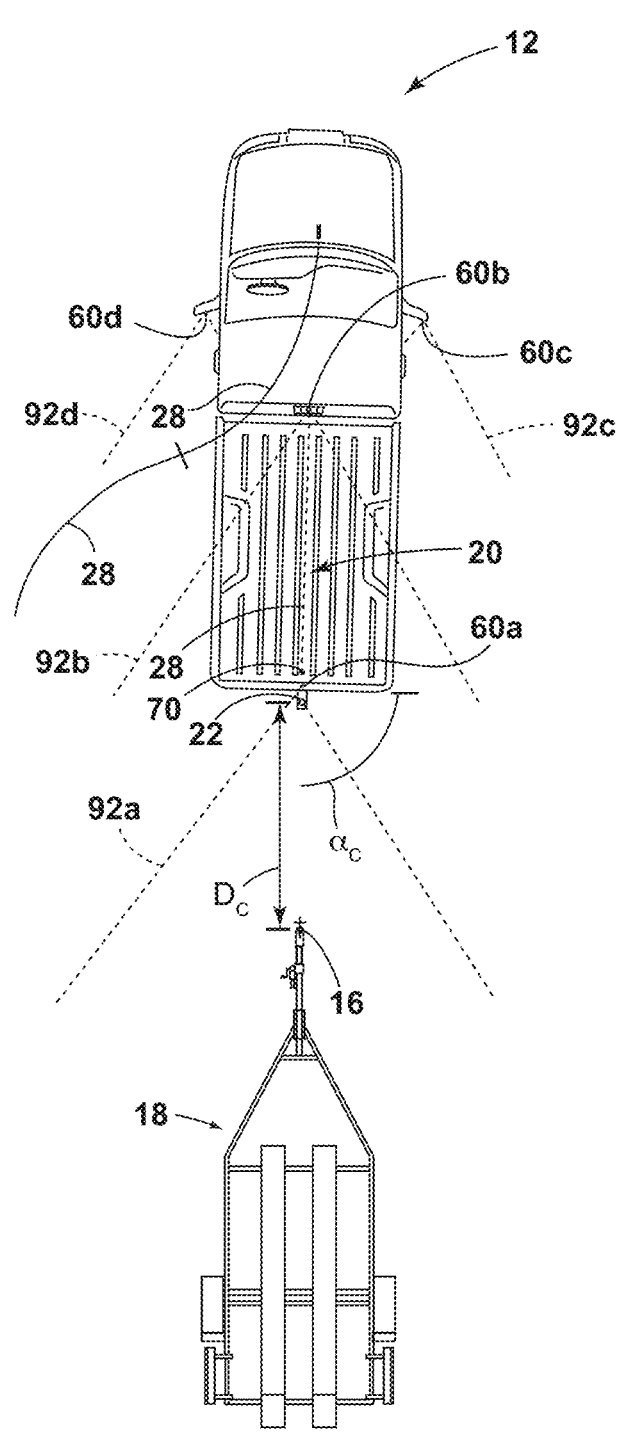
FIG. 4 is a plan view of the vehicle controlling the alignment sequence with the trailer.

Referring now to FIGS. 2-4, the hitch assistance system 10 includes a sensing system 150. The sensing system 150 includes various sensors and devices that obtain or otherwise provide vehicle status-related information. This information includes positioning information from a positioning system 32, which may include a dead reckoning device 34 or, in addition to or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by the sensing system 150 may include a speed of the vehicle 12 from a speed sensor 38 and a yaw rate of the vehicle 12 from an inertial measurement unit (IMU) 40. In various embodiments, the IMU 40 may comprise or be in communication with a variety of sensors including, but not limited to, a gyroscope, an inclinometer, and/or an accelerometer. Additionally, the mass of the vehicle 12 may be measured by one or more weight sensors or pressure sensors in communication with the controller 14. In various embodiments, a proximity sensor 42, or an array thereof, and other vehicle sensors, such as image sensors, and/or devices may provide sensor signals or other information, such as sequential images of the trailer 18, including the detected coupler 16, that the controller 14 of the hitch assist system 10 may process with various routines to determine the height and position (e.g., based on the distance $D_e$ and angle $\alpha_c$) of coupler 16. As discussed herein, the proximity sensor 42 may correspond to a radar sensor, laser sensor, ultrasonic sensor, inductive, or various sensory devices that may be implemented or incorporated with the vehicle 12. In various implementations, the sensing system 150 includes an imaging system 60 that includes one or more image sensors, such as cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, CHMSL camera 60b, and side-view cameras 60c and 60d, respectively. In this manner, image data from two or more of the cameras can be combined in an image processing routine, or in another dedicated image processor within imaging system 60, into a single image. As described herein, the various sensors of the sensing system 150 transmit sensor data to the controller 14 of the hitch assist system 10.

As further shown in FIG. 2, the hitch assist system 10 is in communication with the steering system 50 of vehicle 12. The steering system 50 may be a power-assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power-assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power-assist steering system 50. The steering command may be provided by the hitch assist system 10 for autonomously steering during a trailer hitch alignment maneuver and may alternatively be provided manually via a rotational position (e.g., steering wheel angle) of a steering wheel of the vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power-assist steering system 50 that senses torque on the steering wheel that is not expected from autonomous control of the steering wheel and, therefore, indicative of manual intervention. In this configuration, the hitch assist system 10 may alert the driver to discontinue manual intervention with the steering wheel and/or discontinue autonomous steering. In some embodiments, the vehicle 12 may include a power-assist steering system 50 that allows a steering wheel to be partially decoupled from the movement of the steered wheels 54 of such a vehicle 12.

With continued reference to FIG. 2, the power-assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle conditions to guide the vehicle 12 along the desired path 20 (FIG. 3). It is conceivable that the hitch assist system 10, in some embodiments, may be an integrated component of the power-assist steering system 50. For example, the power-assist steering system 50 may include a hitch assist algorithm for generating vehicle steering information and commands as a function of all or a portion of information received from the imaging system 60, the power-assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as to detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle IMU 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate the speed of the vehicle 12 during alignment of the vehicle 12 with the coupler 16 of the trailer 18, which can reduce the potential for contact with the trailer 18 and can bring the vehicle 12 to a complete stop at a determined endpoint 70 of the path 20. In some implementations, the hitch assist system 10 can additionally issue an alert signal corresponding to a notification of an actual, impending, and/or anticipated contact with a portion of the trailer 18. As mentioned above, regulation of the speed of the vehicle 12 may be advantageous to prevent contact with the trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place of or in addition to touchscreen 74. Further, the hitch assist system 10 may communicate via wireless communication with another embodiment of the HMI 66, such as with one or more handheld or remote devices 80 (FIG. 1), including one or more smartphones. The remote device 80 may also include the display 72 for displaying one or more images and other information to a user U. For instance, the remote device 80 may display one or more images of the trailer 18 on the display 72 and may be further configured to receive remote user inputs via touchscreen circuitry 76. Additionally, the remote device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78*a*, lights 78*b*, a speaker system 78*c*, vehicle accessories 78*d*, etc. In some embodiments, the indicator devices 78 may further include one or more accessories 78*d*, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the remote device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receives information from the above-described sensors and vehicle systems, including the imaging system 60, the power-assist steering system 50, the vehicle brake control system 62, the powertrain control system 64, and other vehicle sensors and devices. The controller 14 may communicate with the various devices described herein via a communication network of the vehicle 12, which can include a controller area network (CAN), a local interconnect network (LIN), or other protocols used in the automotive industry. The controller 14 may generate vehicle steering information and commands as a function of all or a portion of the information received. Thereafter, the vehicle steering information and commands may be provided to the power-assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, such as trailer detection and navigation routine 90. It is contemplated that the trailer detection and navigation routine 90 may include a plurality of sub-routines, such as an image processing routine.

It should be appreciated that the controller 14 may be a stand-alone dedicated controller or may be a shared controller integrated with other control functions, such as integrated with a vehicle sensing system, the power-assist steering system 50, and other conceivable onboard or off-board vehicle control systems. It should further be appreciated that one or more routines or sub-routines, such as the image processing routine, may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of any other functionality it may also implement (including simultaneously with executing the image processing routine).

Figure 6:
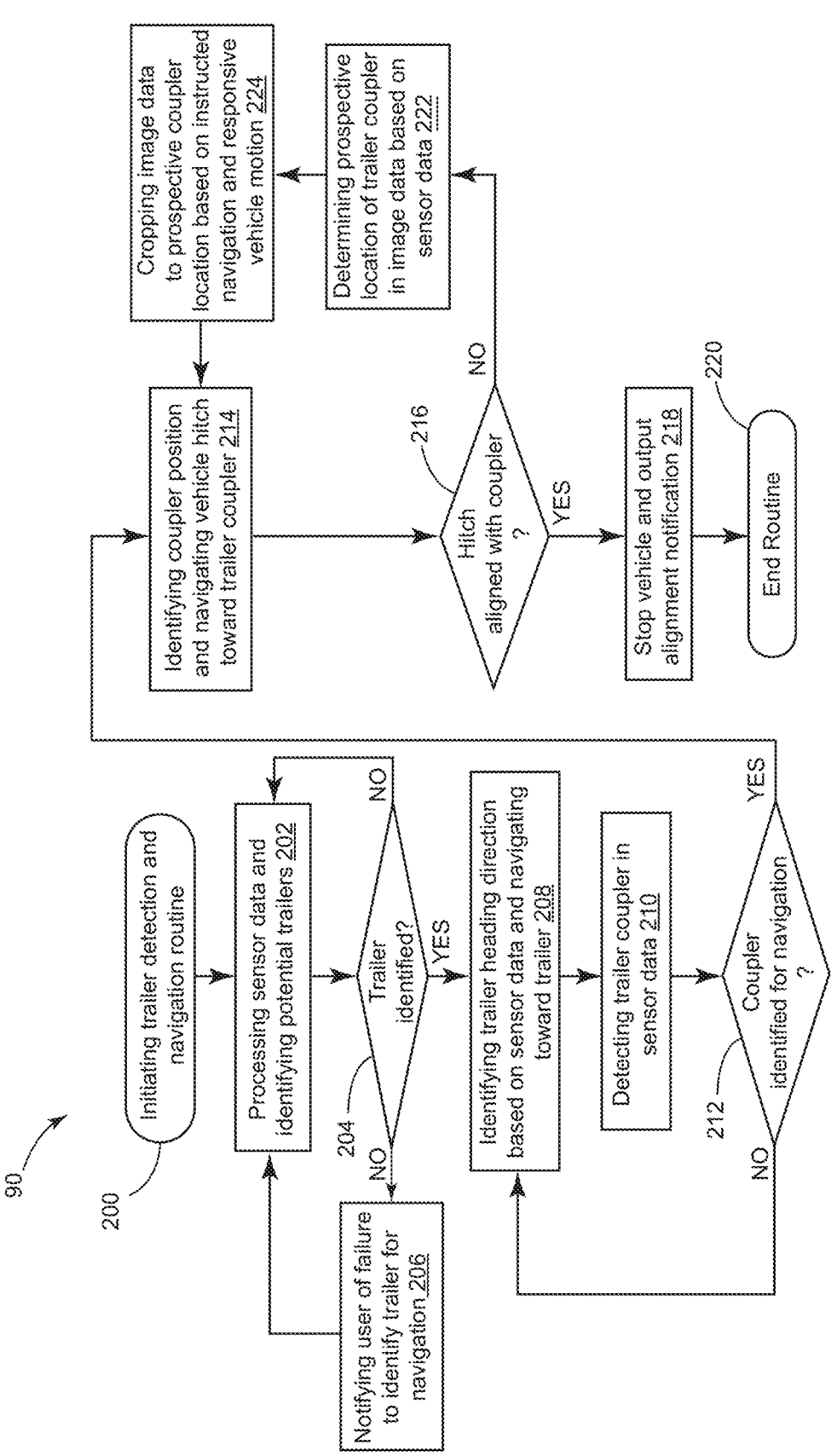
FIG. 6 is a flow chart demonstrating a method for executing a trailer detection and navigation routine of the hitch assist system.

Referring now to FIG. 6, a flow chart of the trailer detection and navigation routine 90 is illustrated. The routine initiates at step 200. Initiation at step 200 may be based on an input prompted by the user U of the vehicle 12 via, for example, the HMI 66 and received by the controller 14. Next, at step 202, sensor data received from the sensing system 150 of the vehicle 12 is processed by the controller 14 to identify potential trailers 18 in the exterior environment of the vehicle 12. The sensor data that is processed may include image data from the imaging system 60. Further, the sensor data may include data received from one or more proximity sensors 42 of the vehicle 12, such as one or more radar sensors. In an exemplary embodiment, image data from the imaging system 60 and proximity data from one or more proximity sensors 42 are processed at the controller 14 at step 202 of the routine 90 to identify potential trailers 18 in the exterior environment of the vehicle 12. In various implementations, image data is processed at the controller 14 via utilization of the trailer detection model 25A.

Next at step 204 the controller 14 determines whether a trailer 18 has been identified based on the processed sensor data. If it is determined that a trailer 18 has not been identified, the controller 14 may continue processing sensor data at step 202 or may first notify the user U of the failure to identify the trailer 18 by, for example, the HMI 66 of the vehicle 12 at step 206 before continuing to process sensor data at step 202. If the controller 14 determines that a trailer 18 is identified at step 204, the trailer heading direction is determined at step 208 based on the sensor data received at the controller 14 from the sensing system 150. In various implementations, the vehicle 12 may be maneuvering toward the trailer 18 during execution of the step 208, and the sensor data received at the controller 14 may include data pertaining to various parameters of the vehicle 12. The sensor data that is processed by the controller at step 208 may include image data from the imaging system 60. Further, the sensor data may include data received from the one or more proximity sensors 42 of the vehicle 12, such as one or more radar sensors. In an exemplary embodiment, image data from the imaging system 60 and proximity data from the one or more proximity sensors 42 are processed at the controller 14 at step 208 of the routine 90 to identify the trailer heading direction of trailer 18 identified previously in the exterior environment of the vehicle 12. In various implementations, the heading direction of the identified trailer 18 is determined based on proximity sensor data and/or image data input into the trailer detection model 25A that utilizes a neural network trained based on a plurality of images depicting trailers.

Next, at step 210, a trailer coupler 16 is detected in sensor data. As discussed above, the coupler 16 may be detected in image data and/or proximity sensor data. At step 212, the sensor data is processed to identify the detected coupler 16 of the trailer 18. Proximity sensor data and/or image data may be utilized by the controller 14 to identify the coupler 16. Successful identification of the detected coupler 16 may hinge on various features of the coupler 16 being identified as present by the controller 14 based on the sensor data received. In some implementations, identification of the coupler 16 is determined based on processing of proximity sensor data and/or image data via the coupler detection model 25B that utilizes a neural network trained based on a plurality of images depicting couplers.

If the detected coupler 16 is not identified at step 212, the routine 90 may continue processing sensor data at step 208. If the coupler 16 is identified at step 212, a position of the identified coupler 16 is determined at step 214 based on sensor data, and the vehicle 12 is maneuvered toward an aligned position, wherein the hitch ball 13 is aligned with the coupler 16. If it is determined at step 216 that the vehicle 12 is in the aligned position, such that the hitch ball 13 is aligned with the coupler 16, the vehicle 12 maneuver terminates and an output alignment notification is given to the user U (e.g., via the HMI 66) at step 218, and the routine ends at 220. If, at step 216, it is determined that the vehicle 12 is not in the aligned position, a prospective location (i.e., estimated subsequent location) of the identified trailer coupler 16 in image data is determined at step 222 based on the identified coupler position and the navigation of the vehicle hitch toward trailer and/or sensor data relating thereto. Next, at step 224, image data is cropped, such that the controller 14 processes a select portion of the image data that includes the prospective coupler location determined at step 222.

The cropped image data is then processed by the controller 14 to identify the coupler 16 position as the vehicle 12 navigates toward the alignment position at step 214. This process of identifying the coupler position at step 214, determining a prospective coupler location at step 222, and cropping the image data to that which includes the prospective coupler location at step 224 is repeated until it is determined at step 216 that the vehicle 12 is in the aligned position. Cropping the image data that is utilized by the controller 14 to the image data that includes the prospective coupler location based on the estimated prospective location of the coupler 16 may advantageously allow the underlying algorithm of the trailer detection and navigation routine 90 to run at higher frame rates, which may result in better precision and final alignment accuracy. By repeatedly estimating the future or prospective location of the trailer coupler 16, the system 10 may incrementally estimate the updated region within the image data depicting the trailer coupler 16 and crop the image data based on the expected position. In this way, the controller 14 may reduce processing power required to determine and update the trailer coupler position and/or increase a rate at which the coupler position is updated to ensure that the location is accurately identified throughout the navigation routine 90.

In some implementations, multiple potential trailers 18 are identified in the exterior environment of the vehicle 12 based on the sensor data received at the controller 14. The hitch assist system 10 may be configured to identify a target trailer 18 from the plurality of potential trailers 18 based the heading direction of the vehicle 12 relative to the potential trailers 18 as determined based on sensor data received at the controller 14. Upon identifying the target trailer 18, the hitch assist system 10 may pause a maneuver of the vehicle 12 and prompt the user U to confirm that the identified target trailer 18 is the correct trailer 18. Upon receiving a confirmation input from the user U, the hitch assist system 10 may resume execution of the routine 90.

It is to be understood that variations and modifications can be made on the aforementioned structures and methods without departing from the concepts of the present disclosure, and further it is to be understood that such concepts are intended to be covered by the following claims unless these claims by their language expressly state otherwise.

It will be understood by one having ordinary skill in the art that construction of the described device and other components is not limited to any specific material. Other exemplary embodiments of the device disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent or may be removable or releasable unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A hitch assistance system for assisting in maneuvering a vehicle toward a trailer, comprising:
  a sensing system that includes an image sensor; and
  a controller configured to:
    identify a position of a coupler of the trailer based on image data received from the image sensor by utilizing a coupler detection model trained based on a library of images depicting couplers;
    control movement of the vehicle toward an aligned position based on the identified position of the coupler, wherein a hitch ball of the vehicle is aligned with the coupler of the trailer;
    determine a prospective location of the coupler in the image data based on sensor data received from the sensing system;

crop the image data based on the determined prospective location of the coupler; and determine a hitch ball center point based on the image data by utilizing a hitch ball center detection model trained based on a library of images including a plurality of images respectively depicting hitch balls, wherein the hitch ball depicted in at least one of the plurality of images has a generally circular outline based on the perspective of the at least one image, and wherein the at least one image includes a hitch ball center point indication overlay that is positioned at a location within the at least one image that is offset from the radial center of the generally circular outline.

2. The hitch assistance system of claim 1, wherein the controller is configured to crop the image data based on the determined prospective location of the coupler, such that a portion of the image data that does not include the prospective location of the coupler is not utilized by the controller to control movement of the vehicle.

3. The hitch assistance system of claim 1, wherein the image data corresponding with the determined prospective location of the coupler is uncropped.

4. The hitch assistance system of claim 3, wherein the controller is configured to identify a position of the coupler based on the uncropped image data that corresponds with the determined prospective location of the coupler.

5. The hitch assistance system of claim 1, wherein the sensing system further comprises:

a proximity sensor, wherein the controller is further configured to identify the trailer in an exterior environment of the vehicle based on at least one of sensor data received from the proximity sensor and the image data received from the image sensor.

6. The hitch assistance system of claim 5, wherein the controller is further configured to determine a trailer heading direction of the trailer based on at least one of the sensor data received from the proximity sensor and the image data received from the image sensor by utilizing a trailer detection model trained based on a library of images respectively depicting trailers.

7. The hitch assistance system of claim 1, wherein the plurality of images respectively depicting hitch balls include hitch ball center point indication overlays, respectively.

8. The hitch assistance system of claim 1, wherein the hitch ball center point indication overlay of the at least one image is positioned at a location within the at least one image that is above the radial center of the generally circular outline.

9. A hitch assistance system for a vehicle, comprising:
a sensing system that includes an image sensor; and
a controller configured to determine a hitch ball center point based on image data received from the image sensor by utilizing a hitch ball center detection model trained based on a library of images including a plurality of images, each of the plurality of images depicting a hitch ball and a hitch ball center point indication overlay, wherein the hitch ball depicted in at least one of the plurality of images has a generally circular outline based on the perspective of the at least one image, and the hitch ball center point indication overlay of the at least one image is positioned at a location within the at least one image that is offset from the radial center of the generally circular outline.

10. The hitch assistance system of claim 9, wherein the hitch ball center point indication overlay of the at least one image is positioned at a location within the at least one image that is above the radial center of the generally circular outline.

11. The hitch assistance system of claim 9, wherein the controller is further configured to:

identify a position of a coupler of a trailer based on the image data received from the image sensor by utilizing a coupler detection model trained based on a library of images depicting couplers;

control movement of the vehicle toward an aligned position based on the identified position of the coupler, wherein a hitch ball of the vehicle is aligned with the coupler of the trailer;

determine a subsequent location of the coupler in the image data based on sensor data received from the sensing system; and crop the image data based on the determined subsequent location of the coupler.

12. The hitch assistance system of claim 11, wherein the controller is configured to crop the image data based on the determined subsequent location of the coupler, such that a portion of the image data that does not include the subsequent location of the coupler is not utilized by the controller to control movement of the vehicle.

13. The hitch assistance system of claim 11, wherein the controller is further configured to:

identify the trailer in an exterior environment of the vehicle based on the sensor data received from the sensing system; and determine a trailer heading direction based on the image data received from the image sensor by utilizing a trailer detection model trained based on a library of images depicting trailers.

14. A hitch assistance system for assisting in maneuvering a vehicle into alignment with a trailer, comprising:

a sensing system that includes a proximity sensor and an image sensor; and a controller configured to:

determine a hitch ball center point based on image data received from the image sensor by utilizing a hitch ball center detection model trained based on a library of images including a plurality of images, each of the plurality of images depicting a hitch ball and a hitch ball center point indication overlay positioned at a location that is offset from the radial center of a generally circular outline of the hitch ball;

identify the trailer in an exterior environment of the vehicle based on sensor data received from the sensing system;

determine a trailer heading direction based on the image data received from the image sensor by utilizing a trailer detection model trained based on a library of images depicting trailers;

identify a position of a coupler of the trailer based on the image data received from the image sensor by utilizing a coupler detection model trained based on a library of images depicting couplers;

control movement of the vehicle toward an aligned position, wherein a hitch ball of the vehicle is aligned with the coupler of the trailer;

determine a future location of the coupler in the image data based on the sensor data received from the sensing system pertaining to the movement of the vehicle and the identified position of the coupler; and crop the image data based on the determined future location of the coupler, such that a portion of the image data that does not include the future location of the coupler is not utilized by the controller to control the movement of the vehicle.

15. The hitch assistance system of claim 1, wherein the trailer is a target trailer, wherein the controller is configured to identify a plurality of trailers in an exterior environment of the vehicle based on the sensor data received from the sensing system, and wherein the controller is configured to identify the target trailer of the plurality of trailers based on a heading direction of the vehicle relative to the plurality of trailers as determined based on the sensor data received from the sensing system.

16. The hitch assistance system of claim 1, wherein the controller is further configured to:

determine a height of the coupler.

17. The hitch assistance system of claim 9, wherein the controller is further configured to:

identify a trailer in an exterior environment of the vehicle based on sensor data received from the sensing system, wherein the trailer includes a coupler;

identify a type of the coupler based on image data received from the image sensor by utilizing a coupler detection model trained based on a library of images depicting couplers;

identify a position of the coupler of the trailer based on the image data received from the image sensor by utilizing the coupler detection model; and control movement of the vehicle toward an aligned position based on the identified position of the coupler, wherein a hitch ball of the vehicle is aligned with the coupler of the trailer.

18. The hitch assistance system of claim 17, wherein the controller is further configured to:

identify a type of the trailer based on the image data received from the image sensor by utilizing a trailer detection model trained based on a library of images depicting trailers.

19. The hitch assistance system of claim 14, wherein the hitch ball center point indication overlay is positioned at a location that is above the radial center of the generally circular outline of the hitch ball for each of the plurality of images.

20. The hitch assistance system of claim 14, wherein the generally circular outline of the hitch ball of each of the plurality of images is based on the perspective of the image of the plurality of images to which the generally circular outline corresponds.

\* \* \* \* \*